Jan. 30, 1945.  E. E. WEMP  2,368,279
TORQUE CONVERTER
Filed Oct. 5, 1942  8 Sheets-Sheet 1

Fig. 1

INVENTOR.
Ernest E. Wemp.
BY
Barnes, Kisselle, Laughlin & Raisch
Attorneys.

Jan. 30, 1945.  E. E. WEMP  2,368,279
TORQUE CONVERTER
Filed Oct. 5, 1942   8 Sheets—Sheet 2

INVENTOR.
Ernest E. Wemp
BY
Barnes, Kisselle, Laughlin & Raisch
Attorneys.

Jan. 30, 1945.   E. E. WEMP   2,368,279
TORQUE CONVERTER
Filed Oct. 5, 1942   8 Sheets-Sheet 4

INVENTOR.
Ernest E. Wemp
BY
Barnes, Kisselle, Laughlin & Raisch
Attorneys.

Jan. 30, 1945.  E. E. WEMP  2,368,279
TORQUE CONVERTER
Filed Oct. 5, 1942  8 Sheets-Sheet 6

INVENTOR.
Ernest E. Wemp
BY
Barnes, Kisselle, Laughlin & Raisch
Attorneys.

Jan. 30, 1945.  E. E. WEMP  2,368,279
TORQUE CONVERTER
Filed Oct. 5, 1942   8 Sheets-Sheet 7

INVENTOR.
Ernest E. Wemp
BY
Barnes, Kisselle, Laughlin & Raisch
Attorneys.

Patented Jan. 30, 1945

2,368,279

UNITED STATES PATENT OFFICE 2,368,279

TORQUE CONVERTER

Ernest E. Wemp, Detroit, Mich.

Application October 5, 1942, Serial No. 460,795

13 Claims. (Cl. 74—189.5)

This invention relates to a mechanism for transmitting torque from one member to another. It has to do particularly with a torque converter of the fluid or hydraulic type for providing infinitely variable torque and speed ratios between a driving member and a driven member.

There are a number of objects of the invention, among which are the following: the provision of a hydraulic mechanism to which some of the torque of the driving member is transmitted thereto and which re-generates this torque back to the driving member; the provision of a hydraulic unit having a torus chamber for the flow of liquid therein and in which the functioning bladed elements in the mechanism are situated in the stream of liquid when the same is flowing substantially in an axial direction to the end that the elements work or function substantially on the same radius; the provision of a re-generating hydraulic mechanism controllable as to its action and particularly controllable by the angular adjustment of the blades of one of the bladed members functioning in the flowing body of liquid; the provision of an arrangement in a liquid torus chamber for providing a substantially uniform velocity front, particularly at the point in the circuit where the liquid is to encounter the blades of one of the rotary bladed elements; the provision of a re-generative system wherein the torque of the driving member is divided through the means of gearing, such, for example, as epicyclic gearing, one division of torque being transmitted to a driven member and another division being caused to be re-generated or fed back to the driving member; the provision of a continuously and automatically actuating torque converter yet one which is controllable as to its re-generating action, i. e., the application of torque through the hydraulic unit to the driving member. To the end of this latter object the blades of one of the hydraulic elements are variable as to their angularity from an extreme low position to an extreme high position. In the low position the arrangement may be such that no re-generating action is effected and in this way, as will later be seen, the transmission of torque from the driving member to the driven member may be substantially discontinued. In the high position, the angularity of the adjustable blades is relatively steep and sufficiently steep for providing the necessary maximum re-generating action.

Other objects of the invention which may relate to the structural features of the mechanism as a whole, or to the hydraulic unit itself, and the manner in which the liquid is caused to flow and to be cooled or other features of the mechanical parts other than the hydraulic unit will become apparent as the following detailed description is considered in conjunction with the accompanying drawings.

Figure 1:
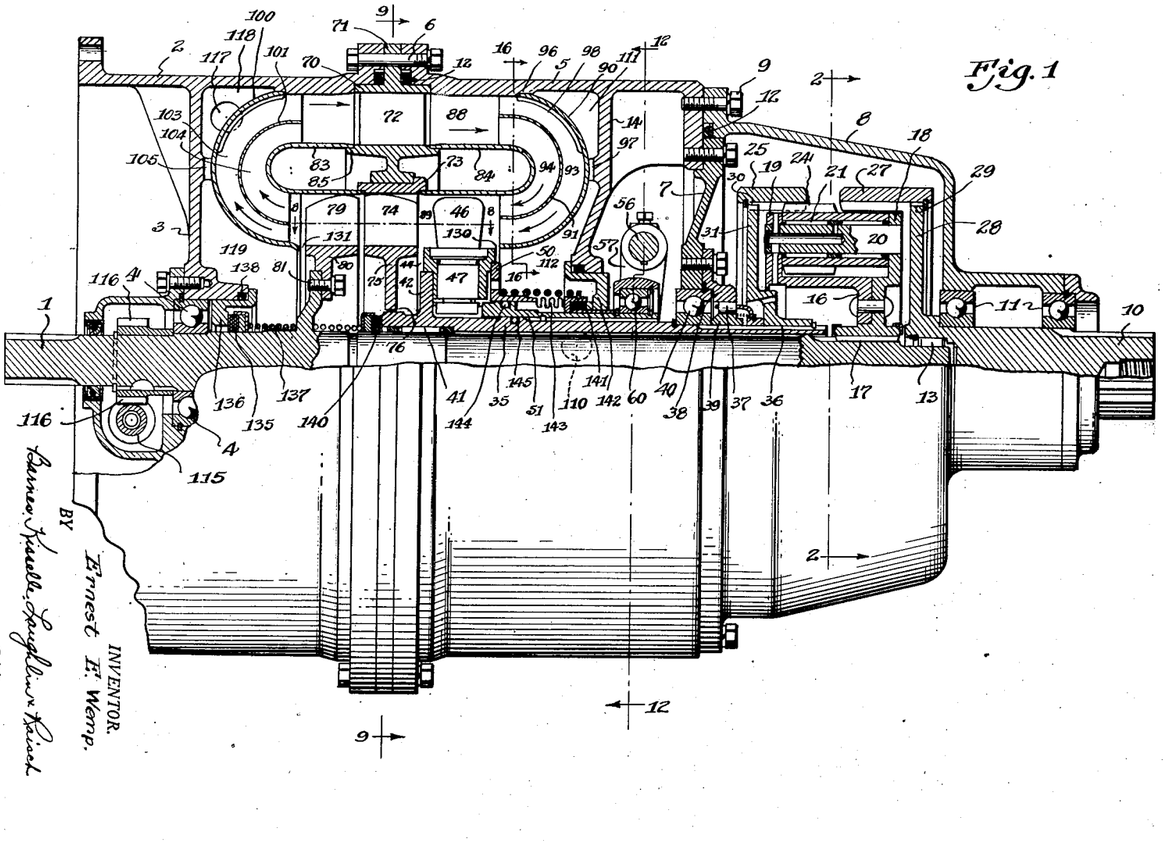
Fig. 1 is a view of the torque converter, being partly in section and partly in side elevation and showing the construction of the hydraulic unit and the mechanical parts.

In Fig. 1 a drive shaft is illustrated at 1 and this is to be connected to a prime mover. The apparatus of this invention appears to be particularly useful with an engine of the internal combustion variety commonly used on both passenger and commercial automotive vehicles, although used in many other places. A housing is shown as including a housing section 2 which may be designed to be connected directly to the prime mover. This housing has an enclosing head or plate 3 in which the shaft 1 is journalled as at 4. The housing includes a second section 5 connected to the housing part 2 as at 6. This part of the housing has a removable end plate or wall 7 and an intermediate head 14. An end portion 8 of the housing is attached to the section 5 as at 9 and a driven member or shaft 10 is journalled in the end section of the housing as at 11. Suitable sealing devices or gaskets are used where the housing sections are joined and these are generally illustrated at 12. The driving shaft 1 is journalled or piloted within the driven member 10 as shown at 13.

Figures 2, 3:
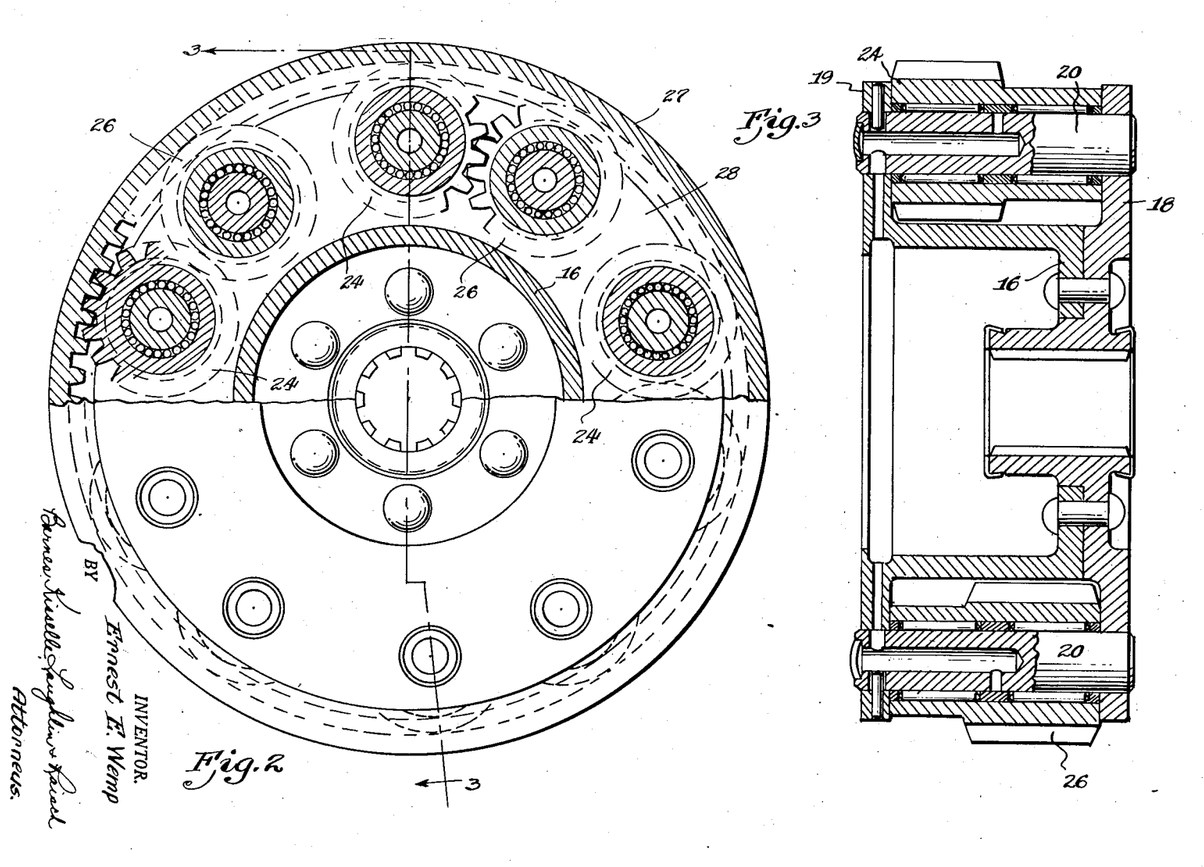
Fig. 2 is a sectional view taken substantially on line 2—2 of Fig. 1 showing the epicyclic gear arrangement.
Fig. 3 is a sectional view taken substantially on line 3—3 of Fig. 2.

First taking up the epicyclic gearing which is situated in the housing section 8, it will be noted that a carrier 16 for the planetary gears is splined to the driving shaft as at 17. This carrier has spaced side plates 18 and 19 for receiving pins 20 upon which the planetary gears are journalled advantageously by small roller bearings 21. As will be seen by reference to Fig. 2, the planetary gears are arranged in pairs. One gear 24 of each pair has gear teeth adjacent one end for meshing with an internally geared element 25. The other gear 26 of each pair has gear teeth adjacent the opposite end for meshing with the internal geared element 27. The teeth of each pair of gears mesh with each other, as shown in Fig. 2. The element 27 is a driven element in that it is connected to a flange 28 of the driven shaft 10, as at 29. The geared element 25 constitutes one of the control members associated with the hydraulic unit and is drivingly connected as at 30 to a plate 31. With this arrangement there is a —1:1 ratio between the internally geared elements 25 and 27. That is, if the planet carrier 16 be held locked, rotation of gear 25 in one direction will produce an equal rotation of gear 27 in the opposite direction.

The torque delivered by the driving shaft 1 is divided with some being transmitted into the driven member 10 and some into the controlling means and to the hydraulic unit through the elements 25 and 31.

Rotatably mounted upon the driving shaft 1 is a sleeve 35 and the plate 31 is keyed or splined thereto as at 36. For purposes which will presently appear, this sleeve and the parts connected thereto are prevented from backward or negative rotation by means of a one-way acting roller brake 37 wherein the rollers are arranged to grip a stationary outer ring 38 secured to the housing member 7 and an inner ring 39 secured to the sleeve 35. The sleeve is journalled in the housing as at 40 and is piloted on the driving shaft as at 41.

Figure 4:
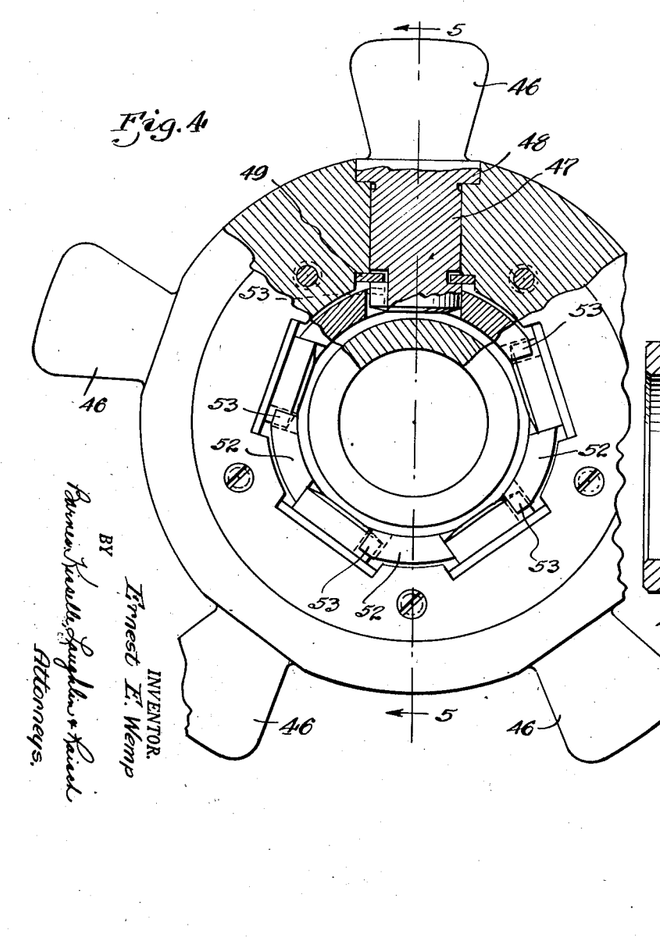
Fig. 4 is an end elevational view with parts in section showing the structure of the impeller of the hydraulic unit.
Figures 5, 8:
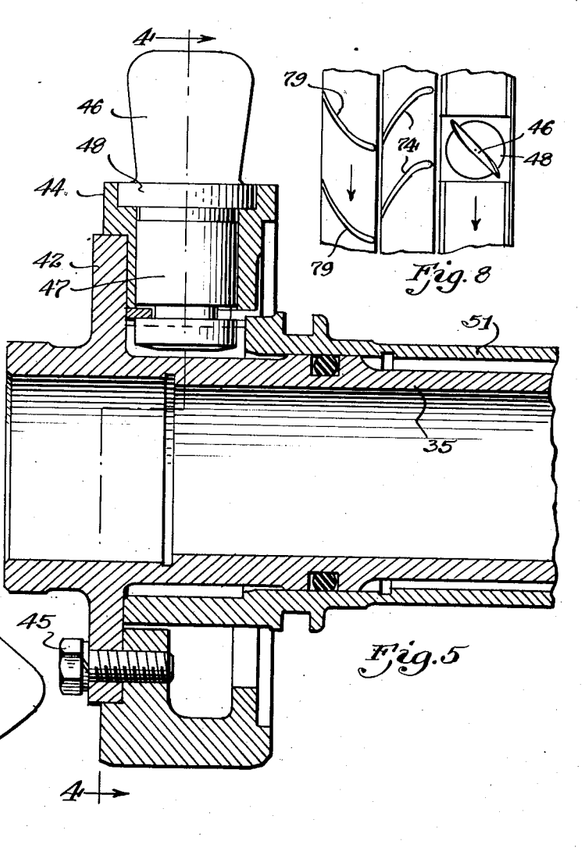
Fig. 5 is a longitudinal sectional view taken through the impeller and its driving sleeve and controlling sleeve.
Fig. 8 is a developed view taken substantially on line 8—8 of Fig. 1 showing the blade arrangement of the impeller, stator and turbine.

This sleeve carries the blades of the impeller. It has a flange 42 for receiving and holding a hub element 44. This hub element (Fig. 4) is provided with radial bores for receiving the impeller blades. Each blade proper is illustrated at 46 and each has a pintle 47 journalled in the hub. The pintle is passed into its bore axially and an enlarged shoulder 48 seats in a counterbore of the hub while the pintle has a circumferential groove for receiving a half washer or washer of U-shape 49. The hub 44 is then secured to the flange 42 by screws 45, and the parts thus held in assembly.

For controlling the angularity of the impeller blades there is a control sleeve 51 which is axially shiftable on the sleeve 35. One end of this sleeve is provided with spaced projecting fingers 52 which pass in between the pintles of the blades. Each pintle, on one side has a gear segment thereon and each finger has a gear rack on one side and the gear teeth of the rack and segment mesh as shown at 53. Thus, axial shift of the sleeve 51 will cause a rotation of the blades of the impeller on their pintles.

Figures 12, 13:
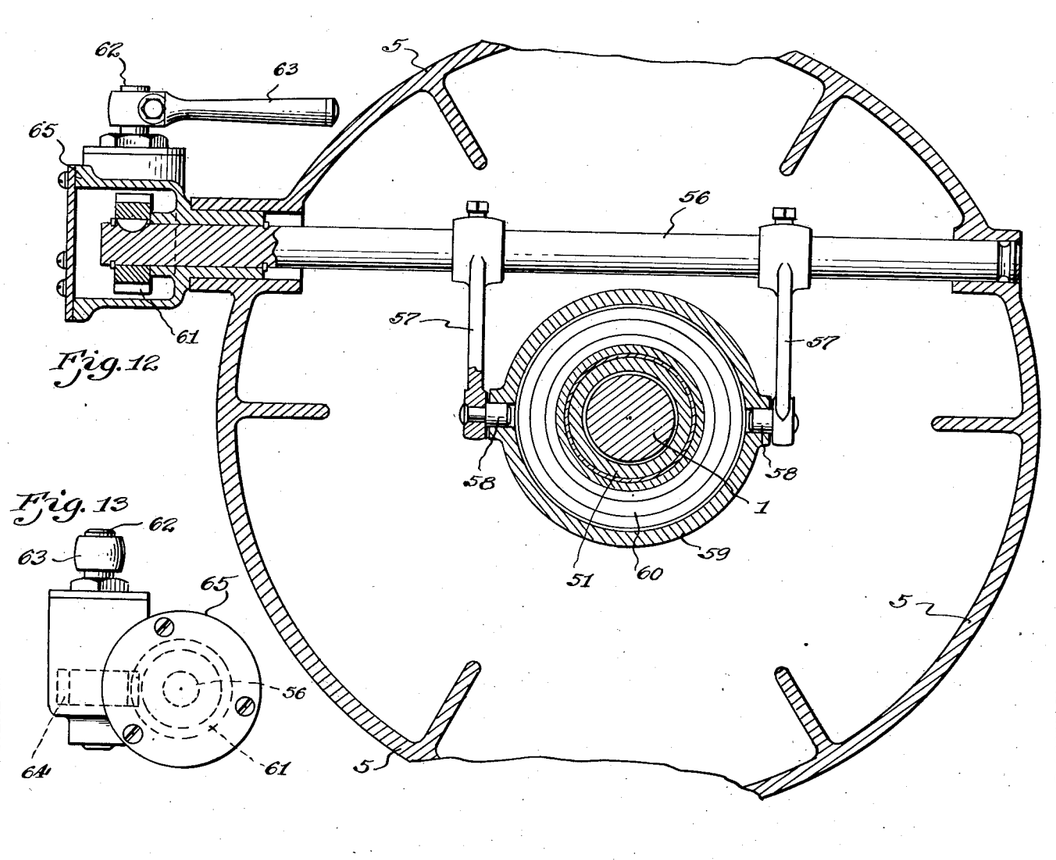
Fig. 12 is a cross sectional view taken substantially on line 12—12 of Fig. 1 illustrating the control means for governing the angularity of the adjustable blades on the impeller.
Fig. 13 is an end view of the control operator, looking from the left of Fig. 12.

The control of the axial position of the control sleeve 51 may be accomplished through the means of a rock shaft 56 journalled in the housing and having a yoke 57 with journal pins 58 connected to and carrying a ring 59 (Fig. 12) positioned over a thrust bearing 60, the inner race of which is fixed against axial movement relative to the sleeve 51 as shown in Fig. 1. This rock shaft is advantageously controlled by an irreversible controlling means so that once positioned, such position will be maintained. This may be accomplished through a worm and worm gear arrangement wherein the worm has an irreversible angle. One end of the shaft 56 extends out through the housing (Fig. 12) and is there provided with a worm gear 61. A control shaft 62, which may have a control handle 63 thereon, is provided with a worm 64 which meshes with the worm gear 61. These control elements may be enclosed by a housing 65. It will be seen that by turning the handle 63 that the shaft 56 is caused to oscillate to thus in turn axially shift the control sleeve 51. Axial forces on the control sleeve will not turn the control shaft 62 because of the irreversible angle on the worm. While, for convenience, the control handle 63 is positioned immediately adjacent the mechanism, it will be understood that any suitable control, such as a linkage connection or a Bowden wire arrangement, may be extended to any convenient location as, for example, to a position where the driver of the vehicle may operate the same.

Figure 7:
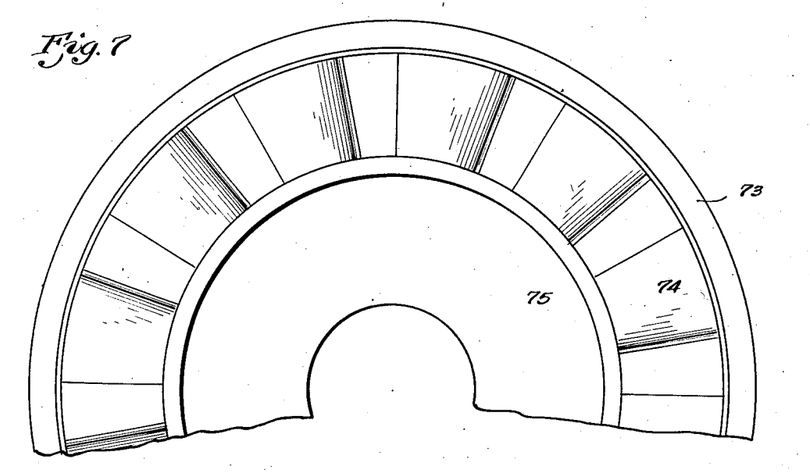
Fig. 7 is an elevational view of the stator of the hydraulic unit showing its construction and blade arrangement.
Figure 9:
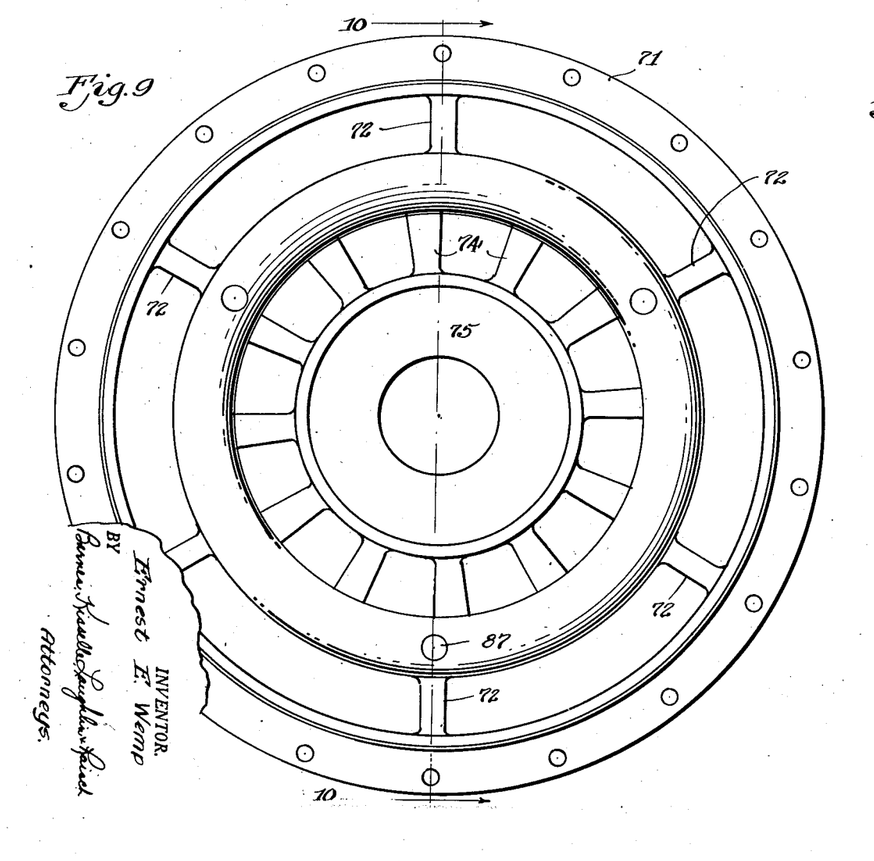
Fig. 9 is a sectional view taken substantially on line 9—9 of Fig. 1 illustrating principally the stator structure and its arrangement in the housing.

A stator is positioned so that its blades or vanes are positioned in the torus chamber adjacent the impeller. The stator may comprise an outer supporting member 70 having a flange 71 positioned between the housing members 2 and 5. A number of struts 72 connect the inner and outer portions of the supporting member and are positioned to lie in the torus chamber. These struts are preferably of streamline construction to minimize interference with the flow of liquid in the torus chamber. The inner or bladed section of the stator has a body 73 press fitted or otherwise non-rotatably secured in the supporting member 70 and it has blades 74 lying between the inner and outer ring parts thereof and it also has an inwardly extending flange 75 which has a close but rotatable fit with the end portion of the sleeve 35, this location being indicated at 76.

Figure 6:
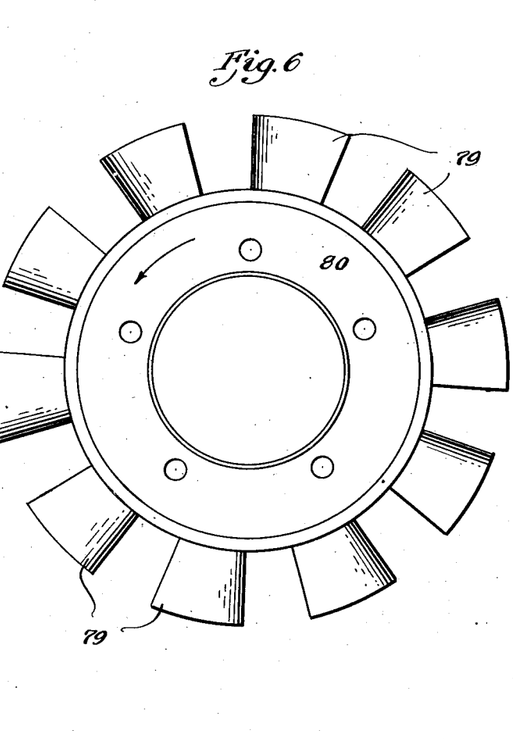
Fig. 6 is an elevational view of the face of the turbine of the hydraulic unit showing the several blades thereon.

The turbine is a member having blades 79 carried by a body member 80 which is secured to a flange on the driving member 1 as shown at 81. It will be noted that the blades of the impeller, stator and turbine are situated in the torus chamber and that the blades are disposed so that they are positioned substantially on the same radius and in the torus chamber where the liquid is flowing axially or substantially axially.

Figure 10:
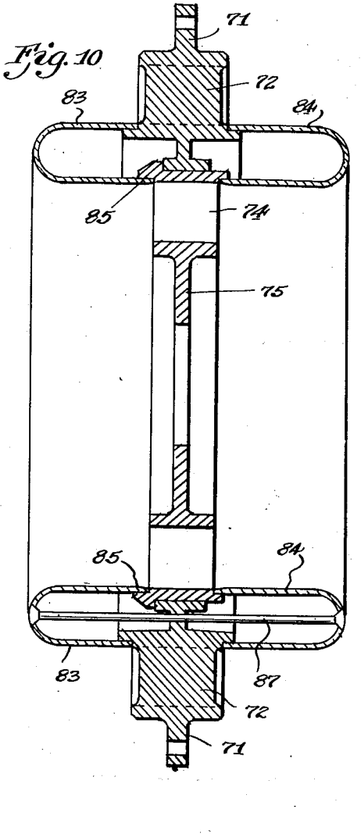
Fig. 10 is a sectional view taken on line 10—10 of Fig. 9 showing the stator and the inner core of the torus chamber.

The torus chamber is located in the space more or less defined by the housing members 2 and 5 and it will be understood that the torus chamber is concentric with the drive shaft 1 and it will be seen that the chamber is somewhat elongated in cross section with its long axis disposed axially of the drive shaft. The inner core of the torus chamber is advantageously provided with two sheet metal members formed into U-shape cross section, as shown at 83 and 84, with their edges fitting into machined offsets in the supporting member 70 and in the bladed member 73, as illustrated at 85. These may be held together by a suitable number of elongated rivets 87, as shown in Fig. 10. The inner and outer ring parts of the support 70 complete the outer portion of the torus chamber between the casing members 2 and 5.

An important point in the torus chamber construction lies in the nest formation at the ends of the long axis of the torus chamber where the liquid is to be directed through an angle of 180°, as this structure has to do with obtaining a substantially uniform velocity front, particularly where the liquid engages the impeller blades. For convenience the torus chamber may be considered as having an axial passage 88 in which lie the supporting struts 72 and an axial passage 89 which accommodates the blades of the impeller, stator and turbine, with the end portions at opposite ends of these passages.

Figure 16:
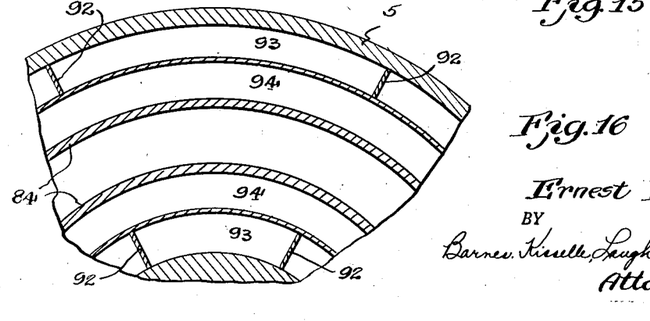
Fig. 16 is a cross sectional view taken substantially on line 16—16 of Fig. 1 showing the arrangement in the torus chamber.

One end portion comprises an outer wall 90 in the form of a sheet metal annulus of curved form in cross section and a nest structure is provided by an additional dividing wall 91. The walls 90 and 91 may be connected into a single sub-assembly by plates or strips 92 (Fig. 16) and this structure provides an outer channel or passage 93 and an inner channel or passage 94 through which the liquid flows. For the purpose of holding this nest structure in position within the housing, the housing may be formed to provide a seat and shoulder 96 for the outer peripheral edge of the member 90 while the bottom of the member 90 seats upon the partition 14 having accurately machined lugs or projections 97. The lugs or projections 97 permit passage of fluid past the same. The strips 92 are cut away as at 98 to provide some spacing relative to the member 90 with the result that the member 90 may be pushed into position within the housing part 5 and its outer peripheral edge is flexed and then the same snaps into position behind the shoulder at 96.

The opposite end of the torus chamber is of similar construction and which can be similarly assembled, the outer wall being shown at 100, the nest wall at 101 forming passageways 104 and 103 and the end head 3 of the housing 2 is formed with the projections 105 upon which the member 100 seats. The direction of flow of liquid in the torus chamber is clockwise as Fig. 1 is viewed and as shown by the arrows, and the arrangement of the nesting structure, as mentioned above, provides for the obtaining of the substantially uniform velocity front, particularly at the impeller blades, but this point will be discussed later.

Figure 14:
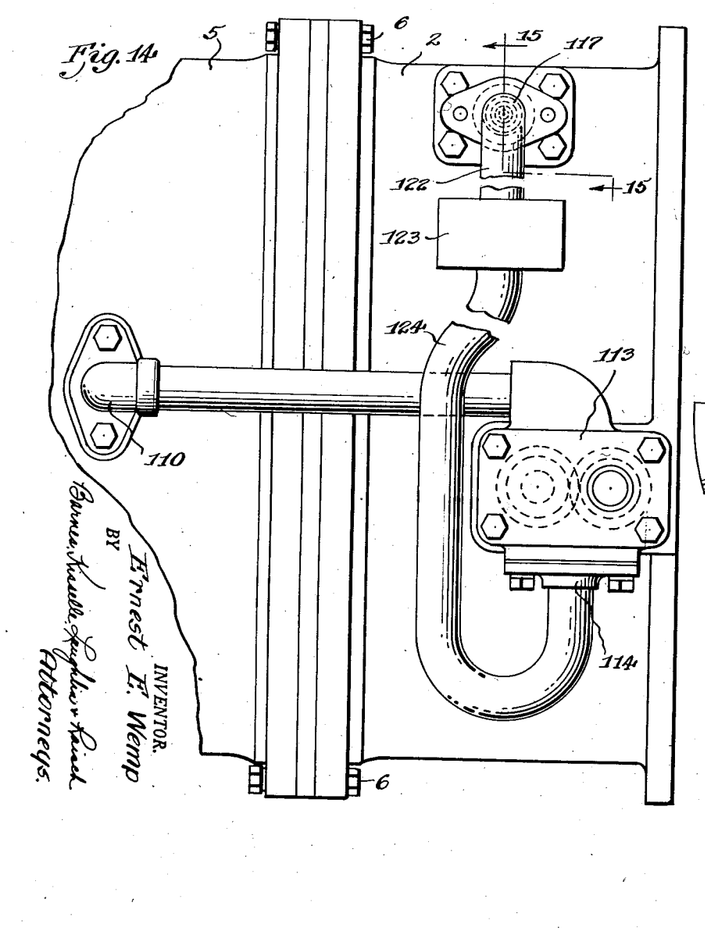
Fig. 14 is a side elevational view showing the side of the unit reverse to that of Fig. 1 and illustrating the outside circulating means for the liquid employed in the hydraulic unit.
Figure 15:
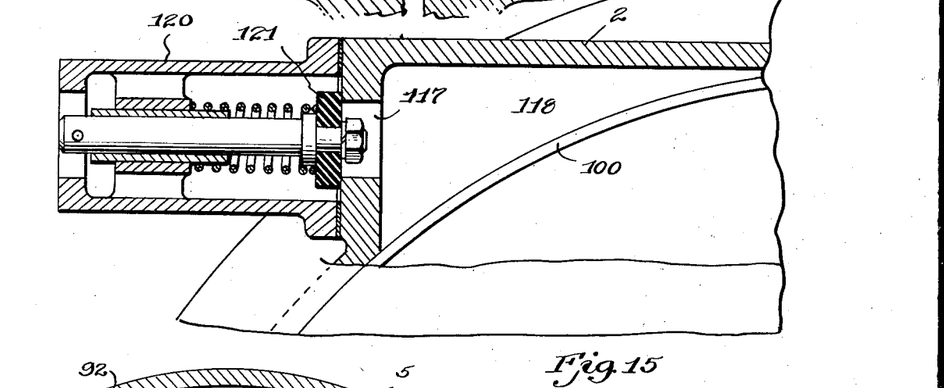
Fig. 15 is a view largely in cross section taken on line 15—15 of Fig. 14 showing a pressure release valve.

The liquid to be used in the torus chamber may be an oil or special substance provided for the purpose or water, and water is advantageous because of its relatively high specific gravity and low viscosity. In any event, the liquid may be in a circulatory system so that in addition to the flow in the torus chamber the liquid is passed through a circuit in which it may be cooled. To this end (see Fig. 14) there is an inlet 110 which connects into the space 111 back of the nest plate 90, this space being in communication with its inner portion 112 through the projections at 97. A suitable pump 113 secured to the side of the housing has an inlet 114 for the liquid. This pump may be driven by a helical gear 115 and a mating helical gear 116 operating from the drive shaft, as shown in Fig. 1. An outlet port 117 leads from the chamber 118 back of the nest plate 100, the area 118 having an inner part 119 in communication therewith at the seat projections 105. A suitable pressure may be maintained on the liquid and to this end the outlet may have a static pressure relief valve in the form of a casing 120 with a spring pressed valve member 121 normally closing the outlet port 117. The pump operates against the relief valve and liquid flows through conduit 122 which may lead to a suitable cooler 123 and then through a conduit 124 back to the pump inlet 114.

A clearance 130 is provided between the inner peripheral edge of the nest plate 90 and the impeller and the water pumped into the space 111—112 may enter the torus chamber through this clearance and the water is already moving generally in the direction of the flow in the torus chamber. A clearance 131 is provided between the turbine and the inner peripheral edge of the nest plate 100 so that the water which is displaced by that coming into the torus chamber flows out through the clearance 131 into the chamber 119—118. The inner peripheral edge of the nest plate 100 may be flared outwardly of the torus chamber, as shown.

It will be seen that the entire space in the housing between the end head 3 and the head 14 contains the liquid under pressure and suitable seals should be provided. To this end a seal structure 135 frictionally engages a shouldered element 136 under the pressure of a spring 137 to provide a seal between the housing and the shaft adjacent the bearing 4. The element 136 may be sealed relative to the housing by a so-called O-ring 138. A similar seal is provided at one end of the sleeve 35 as at 140. Another seal 141 engages element 142 sealed to the head 14 by an O-ring and this seal may be of the expanding bellows type having a bellows 143, one end of which joins the sealing member 141 and the other of which connects to a flange on the washer 50. This prevents the escape of liquid around the outside of the reciprocating control sleeve 51. Seals of the O-ring type may also be employed between the control sleeve 51 and the member 50 as shown at 144 and between the control sleeve and the impeller sleeve, as shown at 145, there being no relative rotation between these parts but only a movement comprising the axial shift of the control sleeve 51.

Figure 17:
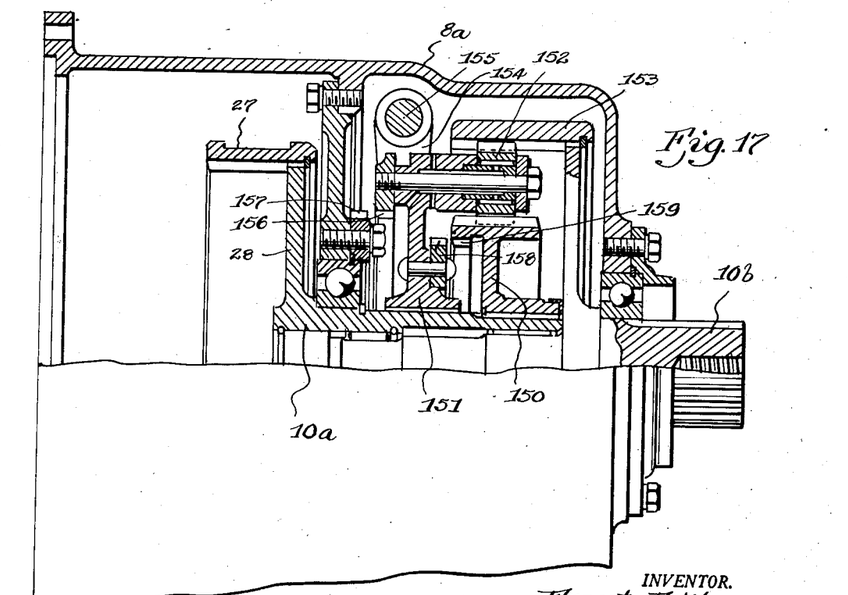
Fig. 17 is a view largely in cross section showing a reversing mechanism which can be employed in connection with the torque converter.

With an engine of the internal combustion type the structure described will operate the driven member only in one direction. The structure shown, however, may be used with a reversing mechanism and a suitable form of such reversing mechanism is shown in Fig. 17. Here the driven member 10a corresponds to the driven member 10 and the final driven member is shown at 10b. The structure shown is disposed in a housing 8a which may replace the housing 8. Keyed to the driven member 10a is a sun gear member 150 and journalled and slidably mounted upon the driven member 10a is a carrier member 151. This carrier member has a plurality of planetary pinions journalled thereon, as shown at 152. The teeth of these pinions mesh with the teeth of the sun gear 150 and with an internal gear member 153 which is connected to the driven member 10b. The carrier member may be shifted by a shifting fork 154 operating from a controlling rock shaft 155. Teeth 156 on the carrier member are arranged to mesh with teeth 157 carried by the housing and teeth 158 are arranged to mesh with teeth 159 on the sun gear. In the position shown the structure is in neutral since rotation of the member 10a will cause the carrier 157 to have an idling movement without driving the member 10b. If the carrier is shifted to the left to establish a dental engagement between 156 and 157, the carrier is locked in a stationary position and the member 10b will be driven in reverse. If the carrier is shifted to the right to establish a dental engagement between 158 and 159, the carrier is locked with the sun gear and the sun gear and carrier ring 153 and driven member 10b operate as a locked-up unit.

Figure 11:
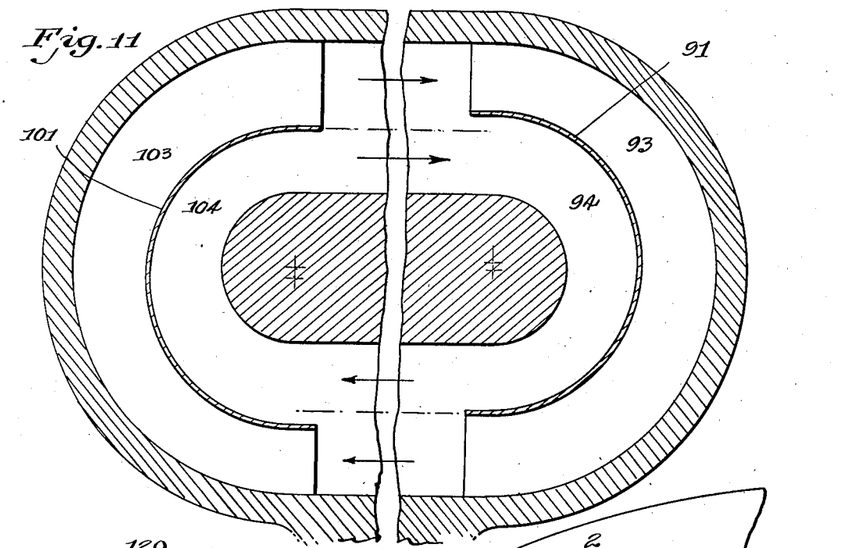
Fig. 11 is a cross sectional diagrammatic view showing the two ends of the torus chamber moved in proximity to each other with the vaned elements removed to demonstrate the arrangement for providing a substantially uniform velocity front for the liquid.

Before describing the operation of the structure, reference should be made to Fig. 11 showing the torus chamber nesting arrangement. It has been found that with a torus chamber of this general type the velocity of the liquid in the outer regions of the torus chamber is greater than that near the inner regions. The outer regions of the torus chamber thus referred to are those adjacent the nest plates 90 and 100 and the walls of the axial parts of the chamber in line with the ends of these nest plates, while the inner regions are those adjacent the core. The preferred arrangement is to construct the blades, and particularly the blades of the impeller, to operate at a uniform velocity across their radial extent, the shape of the blade being varied to take care of the varying radius but being designed to provide a straight line function across its face on any given radius. To provide for a uniform velocity front, particularly where the liquid enters the impeller blades, the nest plates 91 and 101 are offset relative to each other. In an advantageous structure, the nest plate 91 may be positioned so that the area in the inlet of the passage 93 is substantially equal to the inlet of the passage 94. In other words, the area of the passages 93 and 94, where they communicated with the axial passage 88, are equal. Likewise, the areas at the outlet of passage 94 and outlet of passage 93 are equal. Thus, it will be seen the radial dimension across the outlet of passage 93, which is on the smaller radius, is greater than that of the outlet of 94; and the radial dimension across the inlet of passage 93, which is on the larger radius, is less than that across the inlet of passage 94. But the nest plate 101 is not so arranged. Its disposition is such that the inner peripheral edge of the nest plate 101 is disposed radially inwardly (i. e., toward the axis) relative to the inner peripheral edge of the nest plate 91. Also, the outer peripheral edge of the nest plate 101 is positioned radially inwardly relative to the outer peripheral edge of the nest plate 91. Thus the passage 103 gradually increases in cross sectional area in the direction of flow of the liquid, and the passage 104 gradually decreases in the same direction. The situation may be visualized in this way: Some of the liquid which passes into the axial passage 88 from the passage 103 is sliced off by the outer peripheral edge of the nest plate 91 and crowded into the passage 94. This, it is believed, increases the velocity through passage 94 to what it would otherwise be, and, it is believed, decreases the velocity in the passage 93, and particularly along the wall of the nest plate 90. Also, some of the liquid entering the axial passage 89 from the passage 93 is sliced off and crowded into the passage 104, thus again providing accelerating function to the flow of liquid in the inner regions of the torus chamber. Possibly the fact that the passageway 103 gradually increases in cross sectional area and that the passageway 104 gradually decreases in cross sectional area in the direction of the flow of liquid is a contributing factor. The result is that by selecting a proper diametral relationship of the nest plates relative to each other, a substantially uniform velocity of flow may be obtained across the torus chamber in the axial passage 89 thereof, and particularly at a point where the liquid comes into engagement with the impeller blades. If the velocity front is not uniform in the axial passage 88, the matter is not of particular concern since there are no blades functioning therein.

The structure operates to provide infinitely variable speed and torque ratios between the driving member 1 and the driven member 10. The torque of the driving member is divided at the epicyclic gearing and some of it is transmitted to the driven member and some of it is transmitted to the hydraulic unit. The angularity of the blades of the impeller may be controlled to give the desired action under existing conditions. The impeller blades may be adjustable through about 40° with one extreme position where the impeller blades substantially parallel the plane of rotation or are at a substantially zero pitch. In this position the impeller blades are ineffective for causing flow of liquid in the torus chamber and the impeller rotates substatnially free of any pumping action and provides no reaction except that which is unavoidable due to friction, etc., with the result that no substantial torque is transmitted to the driven member. When the impeller blades are adjusted, however, to angular position such, for example, as that shown in Fig. 8, the liquid in the torus chamber is caused to flow therein. This sets up a pressure head in that region between the impeller and the stator. Incidentally, this is the reason for the close running fit at 76 to prevent any substantial loss of liquid from this pressure area. The stator vanes are curved in accordance with known hydraulic principles to convert the pressure head into velocity head in a direction which is the same as the direction of the rotation of the turbine and, therefore, the driving shaft. The turbine blades may be of a form which are just the reverse of the stator blades and the liquid is directed onto the turbine blades where the velocity is spent in doing work on the turbine, thus re-generating that portion of the torque divided at the epicyclic gearing back into the driving shaft.

The torque delivered to the driven member is proportional to the reaction on the impeller and this reaction is employed usefully by doing work on the driving shaft. Assume, for example, that the structure is in an automotive vehicle with the blades of the impeller positioned in the plane of rotation and the engine of the vehicle idling.

To transmit torque to the driven member and thus drive the vehicle, the operator shifts the blades of the impeller to cause the turbine to "ride on" the impeller. By this, the term "ride on," is meant that the pressure head of the impeller, when changed into velocity head by the stator, matches or over matches the velocity demanded by the turbine blades for effective operation at the then turbine speed.

Until this over riding condition prevails there is no re-generation or feed back of power to the driving shaft, and the device acts simply as a divided torque mechanism. There is thus a reaction on the impeller and a transmission of torque to the driven member and in turn the hydraulic unit is re-generating the torque reaction into the driving shaft. Should a point be reached where the speed of the driving shaft is such that the turbine is no longer "riding on" the impeller, then the impeller blades, assuming the maintenance of the same speed, must be shifted to a steeper angle. The direction of rotation of the turbine and the impeller are the same, as shown by the arrows in Fig. 8. Should a condition prevail where the impeller and turbine are operating at the same speed, then there is a 1:1 ratio between the drive shaft and the driven shaft. The faster the impeller turns relative to the turbine, the lower the ratio between the drive shaft and the driven shaft, and it will be seen that this variation is infinite. The torque required to drive the impeller forms a reaction torque for driving the output shaft 10, and vice versa. Thus the torque demands of shaft 10 due to varying road conditions govern the speed and torque requirements of the impeller, and so with a given impeller blade setting, the control is automatic within a considerable range of output torque requirements of the driven shaft.

There may be occasions when the torque reverses and the driven member is attempting to overrun the driving member as, for example, when the accelerator of an automotive vehicle is released and the vehicle allowed to coast against the engine. Such a condition may attempt to cause the internal gear member 25, the shaft 35 and the impeller to operate in the reverse direction, but such reverse movement is prevented by the overrrunning clutch arrangement at 37. Under such a situation the torque from the driven member is transmitted to the driving member directly through the gearing at whatever ratio the gearing arrangement provides.

Thus, there is a re-generative action in that the reaction forces are delivered in the form of work to the drive shaft, the same being delivered to the drive shaft through the turbine in the direction of motion of the drive shaft. This re-generated force is fed back, so to speak, into the driving element. Accordingly, the power required to provide the reaction forces is not lost, but is put back into the system as a driving force. The angularity of the impeller blades may be selected to meet the conditions which exist at any given movement as to the speed of rotation of the parts and torque required to be delivered to the driven member.

I claim:

1. In a torque converter, the combination of a driving member, a driven member, a control member, an epicyclic gearing having a carrier with planetary gears journalled thereon and which is connected to the driving member, and having two members geared to the planetary gears and which are connected respectively to the driven member and the control member so that the torque of the driving member may be divided with some going to the driven member and some to the control member, a hydraulic unit having a torus chamber for liquid with substantially axially extending passages and ends which bend through substantially 180°, an impeller connected to the control member and having blades disposed in an axial passage of the torus chamber for causing flow of liquid in the torus chamber upon rotation thereof, a stator having blades positioned adjacent the impeller blades for receiving liquid from the impeller blades and for giving the liquid a velocity in the direction of rotation of the driving member, and a turbine connected to the driving member and having blades positioned adjacent the outlet side of the stator blades for the impression thereon of the liquid delivered thereto by the stator blades whereby the torque delivered to the impeller may be re-generated in the driving member.

2. In a torque converter, the combination of a driving member, a driven member, a control member, an epicyclic gearing having a carrier with planetary gears journalled thereon and which is connected to the driving member, and having two members geared to the planetary gears and which are connected respectively to the driven member and the control member so that the torque of the driving member may be divided with some going to the driven member and some to the control member, a hydraulic unit having a torus chamber for liquid with substantially axially extending passages and ends which bend through substantially 180°, an impeller connected to the control member and having blades disposed in an axial passage of the torus chamber for causing flow of liquid in the torus chamber upon rotation thereof, a stator having blades positioned adjacent the impeller blades for changing the pressure head established by the impeller to a velocity head and a turbine connected to the driving member and having blades positioned adjacent the outlet side of the stator blades for the impression thereon of the liquid delivered thereto from the stator whereby the torque delivered to the impeller is re-generated in the driving member.

3. In a torque converter, the combination of a driving member, a driven member, a control member, an epicyclic gearing having a carrier with planetary gears journalled thereon and which is connected to the driving member, and having two members geared to the planetary gears and which are connected respectively to the driven member and the control member for the division of torque from the driving member to the driven member and control member, a hydraulic unit having a torus chamber for liquid extending around the axis of the driving member, said torus chamber having a substantially axially extending passage, an impeller connected to the control member and having blades disposed in the said axial passage for causing flow of liquid in the torus chamber upon rotation thereof, a stator having blades positioned in said passage and adjacent the impeller blades for receiving liquid from the impeller blades and for imparting to the liquid a velocity in the direction of rotation of the driving member, and a turbine connected to the driving member and having blades positioned in said passage and adjacent the outlet side of the stator blades for the impression thereon of the liquid at the velocity delivered thereto by the stator blades whereby the torque delivered to the impeller may be re-generated in the driving member.

4. In a torque converter, the combination of a driving member, a driven member, a control member, an epicyclic gearing having a carrier connected to the driving member, at least one pair of planetary gears journalled on the carrier and geared to each other, two gear members geared respectively to the two planetary gears and connected respectively to the driven member and the control member so that the torque in the driving member may be divided with some going to the driven member and some going to the control member, a hydraulic unit having a torus chamber for liquid extending around the axis of the driving member and which has a substantially axially extending passage, an impeller connected with the control member and having blades disposed in the axial passage for causing flow of liquid in the torus chamber upon rotation thereof, a stator having blades in the axial passage adjacent the impeller for receiving liquid from the impeller blades and imparting to the liquid a velocity in the direction of rotation of the driving member, and a turbine connected to the driving member and having blades positioned in said passage adjacent the outlet side of the stator blades for the impression thereon of the liquid delivered thereto at said velocity by the stator blades whereby the torque delivered to the impeller may be re-generated in the driving member.

5. In a torque converter, the combination of a driving member, a driven member, a control member, an epicyclic gearing having a carrier connected to the driving member and two gear members connected respectively to the driven member and to the control member and having planetary gears journalled on the carrier and geared to said two gear members so that when the planetary gears rotate on their journals the two said gear members rotate in opposite directions relative to the carrier, a hydraulic unit having a torus chamber for liquid extending around the axis of the driving member and which has a substantially axially extending passage, an impeller connected with the control member and having blades disposed in the axial passage for causing flow of liquid in the torus chamber upon rotation thereof, a stator having blades in the axial passage adjacent the impeller for receiving liquid from the impeller blades and imparting to the liquid a velocity in the direction of rotation of the driving member, and a turbine connected to the driving member and having blades positioned in said passage adjacent the outlet side of the stator blades for the impression thereon of the liquid delivered thereto at said velocity by the stator blades whereby the torque delivered to the impeller may be re-generated in the driving member.

6. In a torque converter, the combination of a driving member, a driven member, a control member, an epicyclic gearing inter-connecting the said three members so that the torque of the driving member may be divided and delivered part to the driven member and part to the control member, and so that the control member and the driven member are connected by the gearing for turning in opposite directions relative to each other, a hydraulic unit having a torus chamber for liquid and having a passage in the chamber which extends in a substantially axial direction, three bladed elements positioned in said passage, one element being an impeller connected to the control member, another element being a stator, and the third element being a turbine connected to the driving member with the stator positioned between the impeller and the turbine for the re-generation of the torque delivered to the turbine in the driving member.

7. In a torque converter, the combination of a driving member, a driven member, a control member, an epicyclic gearing inter-connecting the said three members so that the torque of the driving member may be divided and delivered part to the driven member and part to the control member, and so that the control member and the driven member are connected by the gearing for turning in opposite directions relative to each other, a hydraulic unit having a torus chamber for liquid and having a passage in the chamber which extends in a substantially axial direction, three bladed elements having their blades positioned in said passage, one element being an impeller connected to the control member, another element being a stator, and the third element being a turbine connected to the driving member with the stator positioned between the impeller and the turbine for the re-generation of the torque delivered to the turbine in the driving member and means for adjusting the angularity of the blades on the impeller.

8. In a torque converter, the combination of a driving member, a driven member, a control member, an epicyclic gearing inter-connecting the said three members so that the torque of the driving member may be divided and delivered part to the driven member and part to the control member, a hydraulic unit having a torus chamber for liquid, three bladed elements having their blades positioned in said torus chamber, one element being an impeller connected to the control member, another element being a stator, and the third element being a turbine connected to the driving member with the stator positioned between the impeller and the turbine for the re-generation of the torque delivered to the turbine in the driving member and means for adjusting the angularity of the blades on the impeller.

9. In a torque converter, the combination of a driving member, a driven member, a control member, an epicyclic gearing inter-connecting the said three members so that the torque of the driving member may be divided and delivered part to the driven member and part to the control member, and so that the control member and the driven member are connected by the gearing for turning in opposite directions relative to each other, a hydraulic unit having a torus chamber for liquid and having a passage in the chamber which extends in a substantially axial direction, an impeller connected with the control member and having blades positioned in said passage, a stator next adjacent the impeller and having blades in said passage, a turbine next adjacent the stator and having blades positioned in said passage, said turbine being connected to the driving member, means for mounting the impeller blades for rotatable adjustment and means for adjustably rotating the impeller blades to vary the angularity thereof whereby the torque delivered to the control member may be regenerated in the driving member.

10. In a torque converter, the combination of a driving member, a driven member, a control member, an epicyclic gearing inter-connecting the said three members so that the torque of the driving member may be divided and delivered part to the driven member and part to the control member, a hydraulic unit having a torus chamber for liquid and having a passage in the chamber which extends in a substantially axial direction, an impeller connected with the control member and having blades positioned in said passage, a stator next adjacent the impeller and having blades in said passage, a turbine next adjacent the stator and having blades positioned in said passage, said turbine being connected to the driving member, means for mounting the impeller blades for rotatable adjustment and means for adjustably rotating the impeller blades to vary the angularity thereof whereby the torque delivered to the control member may be re-generated in the driving member.

11. In a torque converter, the combination of a driving member, a driven member, a control member, an epicyclic gearing inter-connecting the said three members so that the torque of the driving member may be divided and delivered part to the driven member and part to the control member, a hydraulic unit having a torus chamber for liquid, an impeller connected with the control member and having blades positioned in said torus chamber, a stator next adjacent the impeller and having blades in said torus chamber, a turbine next adjacent the stator and having blades positioned in said torus chamber, said turbine being connected to the driving member, means for mounting the impeller blades for rotatable adjustment and means for adjustably rotating the impeller blades to vary the angularity thereof whereby the torque delivered to the control member may be re-generated in the driving member.

12. In a torque converter, the combination of a driving member, a driven member, a control member, an epicyclic gearing inter-connecting the said three members so that the torque of the driving member may be divided and delivered part to the driven member and part to the control member, and so that the control member and the driven member are connected by the gearing for turning in opposite directions relative to each other, a hydraulic unit having a torus chamber for liquid and having a passage in the chamber which extends in a substantially axial direction, an impeller connected with the control member and having blades positioned in said passage, a stator next adjacent the impeller and having blades in said passage, a turbine next adjacent the stator and having blades positioned in said passage, said turbine being connected to the driving member, means for mounting the impeller blades for rotatable adjustment and means for adjustably rotating the impeller blades to vary the angularity thereof whereby the torque delivered to the control member may be re-generated in the driving member, said control means being of the irreversible type for the maintenance of an adjusted position of the impeller blades.

13. In a torque converter, the combination of a driving member, a driven member, a control member, an epicyclic gearing inter-connecting the said three members so that the torque of the driving member may be divided and delivered part to the driven member and part to the control member, and so that the control member and the driven member are connected by the gearing for turning in opposite directions relative to each other, a hydraulic unit having a torus chamber for liquid and having a passage in the chamber which extends in a substantially axial direction, an impeller connected with the control member and having blades positioned in said passage, a stator next adjacent the impeller and having blades in said passage, a turbine next adjacent the stator and having blades positioned in said passage, said turbine being connected to the driving member, means for mounting the impeller blades for rotatable adjustment and means rotatably mounting each impeller blade on a substantially radial axis, an axially shiftable control sleeve with operating means therefor and a dental engagement between the control sleeve and each impeller blade for simultaneous and like angular adjustment of the impeller blades.

ERNEST E. WEMP.